(12) United States Patent
Tijerino

(10) Patent No.: US 6,405,034 B1
(45) Date of Patent: *Jun. 11, 2002

(54) ADAPTIVE COMMUNICATION DATA RETRIEVAL SYSTEM

(75) Inventor: Yuri Adrian Tijerino, San Diego, CA (US)

(73) Assignee: Leap Wireless International, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,188

(22) Filed: Jan. 28, 2000

(51) Int. Cl.[7] ............................................... H04B 3/42
(52) U.S. Cl. ........................ 455/414; 455/412; 455/456
(58) Field of Search ................................. 455/412, 414, 455/517, 456, 418, 425, 68; 701/207, 208; 345/329, 334; 707/102; 379/93.17, 93.07, 93.25; 342/357.01, 357.08, 357.09, 357.1, 357.11, 357.12, 357.13, 357.14

(56) References Cited

U.S. PATENT DOCUMENTS

| | | |
|---|---|---|
| 5,089,826 A | 2/1992 | Yano |
| 5,223,844 A | 6/1993 | Mansell |
| 5,235,633 A | 8/1993 | Dennison |
| 5,285,494 A | 2/1994 | Sprecher et al. |
| 5,479,482 A | 12/1995 | Grimes |
| 5,483,468 A | 1/1996 | Chen et al. |
| 5,712,899 A | 1/1998 | Pace |
| 5,732,074 A * | 3/1998 | Spaur et al. ............... 370/313 |
| 5,774,689 A | 6/1998 | Curtis et al. |
| 5,790,426 A | 8/1998 | Robinson |
| 5,796,394 A * | 8/1998 | Wicks et al. .............. 345/329 |
| 5,814,798 A * | 9/1998 | Zancho ..................... 235/380 |
| 5,862,203 A * | 1/1999 | Wulkan et al. ............. 379/114 |
| 5,864,683 A | 1/1999 | Boebert et al. |
| 5,884,282 A | 3/1999 | Robinson |
| 5,918,014 A | 6/1999 | Robinson |
| 5,923,736 A * | 7/1999 | Shachar ................... 379/93.17 |
| 5,933,599 A | 8/1999 | Nolan |
| 5,937,397 A | 8/1999 | Callaghan |
| 5,958,016 A * | 9/1999 | Chang et al. ............... 709/229 |
| 5,959,543 A | 9/1999 | LaPorta et al. |
| 5,959,577 A * | 9/1999 | Fan et al. ............... 342/357.13 |
| 5,970,122 A | 10/1999 | LaPorta et al. |
| 5,974,300 A | 10/1999 | LaPorta et al. |
| 5,983,214 A | 11/1999 | Lang et al. |
| 5,987,454 A * | 11/1999 | Hobbs ......................... 707/4 |
| 5,995,943 A | 11/1999 | Bull et al. |
| 6,014,429 A | 1/2000 | LaPorta et al. |
| 6,014,654 A | 1/2000 | Ariyoshi |
| 6,018,718 A | 1/2000 | Walker et al. |
| 6,029,141 A | 2/2000 | Bezos et al. |
| 6,041,311 A | 3/2000 | Chislenko et al. |
| 6,049,711 A | 4/2000 | Ben-Yehezkel et al. |
| 6,049,777 A | 4/2000 | Sheena et al. |
| 6,065,012 A | 5/2000 | Balsara et al. |
| 6,069,310 A | 5/2000 | James |
| 6,075,528 A | 6/2000 | Curtis |
| 6,134,591 A * | 10/2000 | Nickles ...................... 709/229 |
| 6,161,008 A * | 12/2000 | Lee et al. .................. 455/414 |
| 6,266,612 B1 * | 7/2001 | Dussell et al. ............. 701/207 |

* cited by examiner

Primary Examiner—Nay Maung
Assistant Examiner—Sonny Trinh

(57) ABSTRACT

The adaptive communication data retrieval system comprises a communication network, a communication device, a server, and a plurality of databases. The adaptive communication data retrieval system provides for sending and receiving personalized information from a communication device via a communication network to a server based retrieval system. The adaptive communication data retrieval system has an adaptive capability to learn and become more efficient at finding focused personalized information through learned usage patterns and/or historical data.

28 Claims, 2 Drawing Sheets

ADAPTIVE COMMUNICATION DATA
RETRIEVAL SYSTEM

FIELD OF THE INVENTION

The invention relates to an adaptive communication data retrieval system for sending and receiving personalized information from a communication device via a communication network to a server based retrieval system.

BACKGROUND OF THE INVENTION

The business world and our personal lives have become highly dependent on the communications industry. Technological advances have created the ability for individuals to access vast amounts of information from anywhere in the world using communication devices such as a desktop computer, a portable computer, a mobile phone, or a pager. The communication devices operate on communication networks such as the Internet, wireless based, and non-wireless based systems.

This technology is changing the way individuals communicate with one another. Business and personal communications have evolved into information dependent worlds. From the business environment to the home, the ability to access information in a quick, efficient, and cost effective manner is desired. Many existing systems allow a business or personal user to access information based on non-personalized, generic searches. The result of these searches is often a list of information sources that are useless or non-related to the search causing significant delays in finding the desired information. This means that the flow of information is slowed down considerably and the user becomes less efficient.

More recently, communication devices have taken personalization into account in only an introductory manner by allowing the user to program certain preferences for the communication device to retrieve. The communication device will only retrieve the programmed preferences with no further personalization, for example, a pager that retrieves stock market information or a mobile phone that retrieves e-mail.

The problem with these systems is that they are limited in only being able to retrieve programmed preferences. It would be beneficial to have a communication device that would adapt to the user's personal preferences. The communication device could use learning usage patterns or historical data patterns to allow the user to have specific personalized information retrieval. The personalized information could also include environmental data such as the position of the user, the date, the time, the weather, or other parameters that would further allow a personalized search.

For the reasons described above, there remains a need for an adaptive communication data retrieval system that allows the user to retrieve personalized data in a quick, efficient, and easy to use manner.

SUMMARY OF THE INVENTION

It is an advantage of the present invention to provide an adaptive communication data retrieval system that provides for highly personalized data retrieval.

It is a further advantage of the present invention to provide an adaptive communication data retrieval system that provides for an adaptive capability to learn and become more efficient at finding focused personalized information through learned usage patterns and/or historical data.

It is yet another advantage of the present invention to provide an adaptive communication data retrieval system that allows the user to retrieve personalized data in a quick, efficient, and easy to use manner.

In one embodiment, the adaptive communication data retrieval system comprises a communication network to facilitate data transmission, a communication device for sending and receiving data via the communication network including a preference storage device for storing preference data and a graphical user interface.

The system also includes a server that interfaces and receives augmented data from the communication device via the communication network.

The server maintains a data listing of communication service choices or information service options that are available to the communication device through the graphical user interface. As used herein, the terms communication service choices and information service options are interchangeable. A plurality of databases interface the server. The server retrieves data from the databases responsive to the augmented data where the augmented data includes a selectable communication service choice and preference data. The server sends the retrieved data to the communication device via the communication network. The implementation of the invention is not dependent on any particular device and can be implemented in various configurations and architectures.

In another embodiment, the invention is a method for processing communication service choices from a user of a communication device. The communication device establishes a connection to a server over the communication network. Communication service choices are displayed to the user on the communication device via the communication network. The user selects a communication service choice and the choice is augmented with preference data. The user's augmented data is sent to the server via the communication network. The server retrieves data responsive to the augmented data. The server then sends the retrieved data to the communication device via the communication network and the communication device displays and stores selected portions of the retrieved data. The communication device preferentially saves selected portions of the retrieved data to update and refine the preference storage device. The implementation of the invention is not dependent on any particular device and can be implemented in various configurations and architectures.

BRIEF DESCRIPTION OF THE DRAWINGS

Understanding of the present invention will be facilitated by consideration of the following detailed description of a preferred embodiment of the present invention taken in conjunction with the accompanying drawings, in which like numerals refer to like parts and in which.

DETAILED DESCRIPTION OF THE INVENTION

Figure 1:
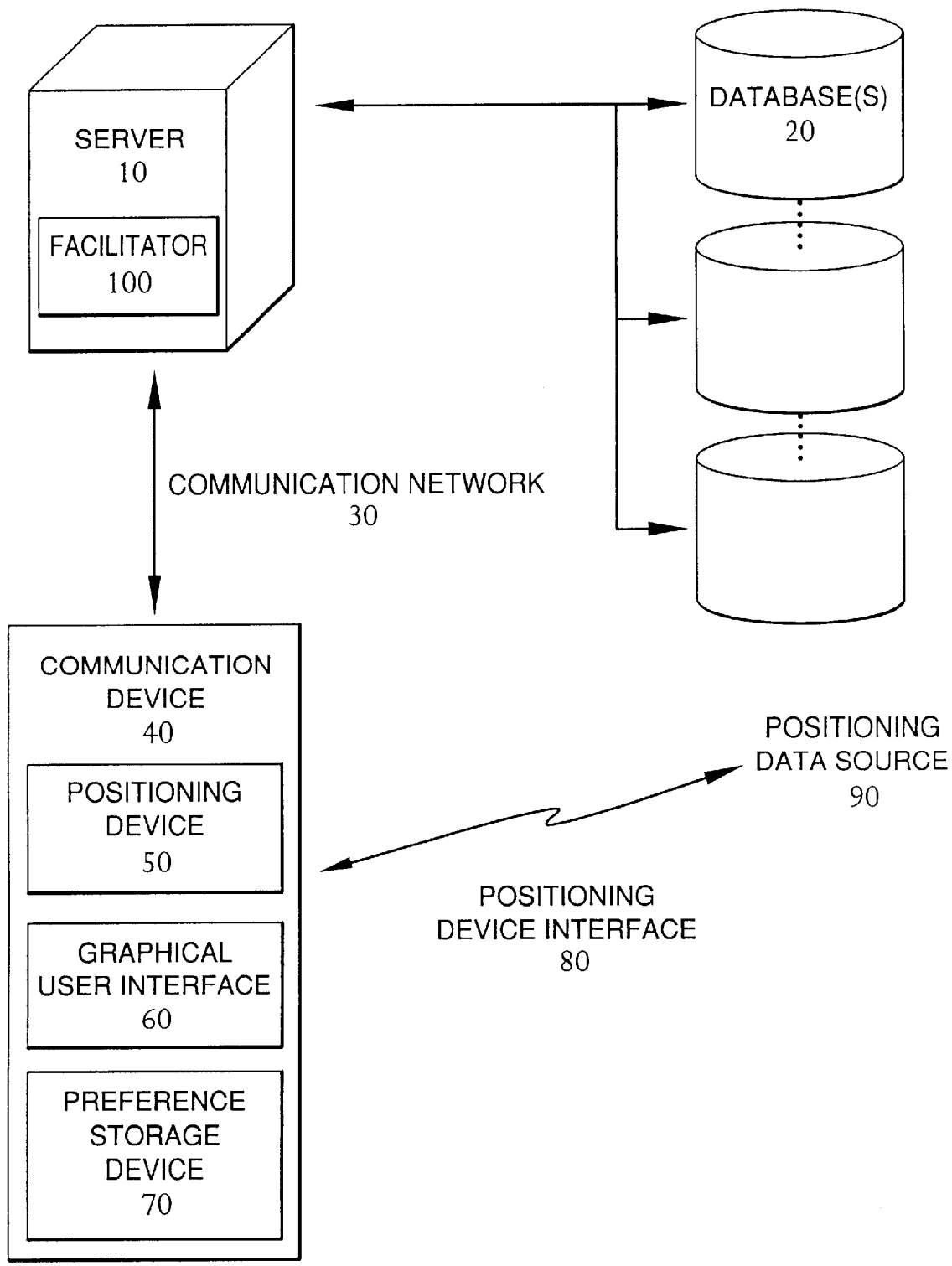
FIG. 1 is a block diagram of the adaptive communication data processing system.

As illustrated in FIG. 1, the adaptive communication data retrieval system comprises a communication network 30, a communication device 40, a server 10, and a plurality of databases 20. The adaptive communication data retrieval system provides for sending and receiving personalized information from a communication device 40 via a communication network 30 to a server 10 based retrieval system.

The adaptive communication data retrieval system is unique because the system has an adaptive capability in that it learns and becomes more efficient at finding focused personalized information through learned usage patterns and/or historical data. The implementation of the invention is not dependent on any particular device and can be implemented in various configurations and architectures.

The communication network 30 can be any network that allows the sending and receiving of data. One example embodiment would be a wireless based system such as cellular, GSM (Global System for Mobile communications), PCS (Personal Communications Services), PDC (Personal Digital Cellular), or radio communications network. Another example embodiment would be a non-wireless based system such as a modem, ISDN (Integrated Services Digital Network), Internet DSL (Digital Subscriber Line), Internet Cable, or direct network based Internet connections. Selection and incorporation of such a communication network will be apparent to those of skill in the art.

The communication device 40 can be any device that allows for user input to be sent and received over a communication network 30. In an example embodiment, the communication device 40 can be a mobile phone, handheld computer, laptop, desktop computer, or a pager. The communication device 40 can include a transceiver or any other device that will allow for sending and receiving data via the communication network 30. The implementation of the invention is not dependent on any particular device and can be implemented in various configurations and architectures.

The communication device 40 is a smart device in that the communication device 40 stores preference data in the preference storage device 70 and augments a user's communication service choice with the preference data to perform highly personalized data retrieval. Communication service choices (information service options) are stored on the server 10 and received by the communication device 40 by establishing a connection from the communication device 40 to the server 10. The server 10 sends a list of communication service choices that are displayed on the communication device 40. The communication service choices can include major service choices that the user will initially see displayed on the communication device 40. The major service choices can include traffic directions, traffic monitoring, points of interest, reservation systems, and any other user desired choices. The major service choices will typically have sub-menus that allow the user to select a more detailed choice under the major service. For example, a user selects the points of interest as the major service and the communication device 40 will display the submenu of the points of interests. The submenu will display more narrowed choices associated with the major service, for example, atm locations, banks, gas stations, restaurants, grocery stores, parks, museums, hotels, department stores, entertainment, vacation spots, and any other user related data.

A user can choose a communication service choice through the graphical user interface 60. The graphical user interface 60 can be any graphical based program that allows input interaction such as a propriety software program or an Internet web browser. The actual selection of the communication service choices can be done through manual entry, voice communication, and/or thought process mechanisms. Manual entry can be accomplished by the user entering the information through a touch screen, keyboard, keypad, and shortcut buttons. Voice communication can be accomplished through the use of a voice recognition system incorporated into the communication device 40, whereby the user speaks into a microphone and the communication device 40 translates the voice data so that the communication device 40 will automatically select the user's selection on the graphical user interface 60. Thought process mechanisms could be incorporated into the communication device 40 to allow hands free entry. Neural attachments could be secured to the user's head so that brain waves could be translated by the communication device 40 so that the communication device 40 will automatically select the user's selection on the graphical user interface.

The communication device 40 includes a preference storage device 70 that stores preference data. The preference storage device 70 can independently eliminate and/or add to the stored preference data. The preference data comprises of user preferences and environmental data. The preference storage device 70 can collect and monitor user preferences from different sources including, but not limited too, a user profile, pre-stored data, pre-acquired data, learned data, historical data, or any other manner that would allow for collection and monitoring of user preferences. The user preferences can include the user's favored choices, redundant choices that the user has used on a recurrent basis, or any other criteria for determining user preferences. For example, the user preferences may include favorite restaurants, preferred cuisines, grocery stores, department stores, gas stations, entertainment, hotels, and vacation spots.

The environmental data can include data based on the position of the user, time, temperature, weather, scheduling data, or any other external information. The environmental data can be collected from environmental devices integrated into the communication device or received from externally located environmental devices. For example, the communication device 40 can include a positioning device 50, a thermometer, a barometer, a clock, and a scheduling program. Alternatively, these environmental devices can be in a remote location, whereby the communication device 40 will receive the environmental data from the external environmental device for the preference storage device 70 to use. The preference data is combined with user's communication service choice resulting in augmented data that is sent to the server 10 for data retrieval.

In one implementation, the communication device 40 can include a positioning device 50 that will independently determine the position of the communication device 40. The positioning device 50 can use any available technology that will enable position determination, for example, GPS (Global Positioning System) or triangulation. A triangulation system determines the position of the communication device 40 by triangulating a signal from the communication device 40 with the fixed locations of two or more base stations.

In the alternative, the communication device 40 can receive the position from a positioning data source 90 via a positioning device interface 80. The positioning device interface 80 allows for the communication device 40 to send and receive positioning information to the positioning data source 90. The positioning data source 90 can use any available technology that will enable position determination such as GPS or triangulation as discussed above. Additionally, the user can supply position information through the communication device 40. The positioning data from any of the above methods can be used for the environmental data incorporated into the preference data. Selection and incorporation of such positioning methods will be apparent to those of skill in the art.

The server 10 has the main function of retrieving data responsive to the augmented data received from the communication device 40 via the communication network 30. The location of the server 10 can be a local based server or a remote server. The server 10 includes hardware and software based systems. The hardware system can be any computer based server system that preferably includes a monitor, a keyboard, a central processing unit, memory, storage devices, and the capability to interface a communication network 30.

Selection and incorporation of such server based hardware will be apparent to those of skill in the art.

The software based system includes an operating system, communication network interface software, and a facilitator 100. The operating system can be any operating system that allows connection to a communication network 30 and provides the ability to run related software. The communication network interface software can be any software that allows for conversion and transmission of data sent to and by the server 10 via a communication network 30. Selection and incorporation of such an operating system and interfacing 10 software will be apparent to those of skill in the art.

The facilitator 100 is a software program or system that resides on the server 10. The facilitator 100 is used to receive augmented data from the communication device 40 via the communication network 30 and to parse the augmented data into retrievable categories. The facilitator 100 uses the retrievable categories to direct sub-component programs to search the databases 20. The sub-component programs return the results of the search data to the facilitator 100. The server 10 can then send the retrieved information to the communication device 40 via the communication network 30. Alternatively, the facilitator 100 can have the ability to take the retrieved search data from the sub-components and add historical suggestion data. The historical suggestion data can reside on the server 10 or in an external database. The historical suggestion data will preferably be a listing of the most widely accessed choices from a plurality of users. This means that the user will receive the data they requested and also receive historical suggestion data. In one implementation, the communication device 40 will display the search results of the user's augmented data and a separate list of suggestions based on other users most accessed choices.

The plurality of databases 20 house an abundant amount of data for the server 10 to retrieve data responsive to the user's augmented data. The databases 20 can be housed on the server and/or remote servers. The server 10 has the ability to access databases 20 stored on remote servers. Selection and incorporation of such databases will be apparent to those of skill in the art.

In a preferred embodiment of the present invention as shown in FIG. 1, the adaptive communication data retrieval system is a wireless location-based information-retrieval system. The communication device 40 is a wireless device that includes a transceiver for sending and receiving communications across a wireless communication network 30. The positioning data source 90 determines a location of the wireless device 40, and provides location data indicative of the location of the wireless device 40. The wireless device 40 further includes an Internet browser accessible through the graphical user interface 60. A remote server 10 includes a transceiver for receiving communications, including the location data, from the wireless device 40. In this embodiment, the remote server 10 also maintains a web page that lists information service options that are accessible to and selectable by the wireless device 40 via the Internet browser. The remote server 10 retrieves information from the databases 20 based upon the location data, a selected service option, and preference data provided by the wireless device. The retrieved information is sent to the wireless device 40 via the wireless communication network 30.

Figure 2:
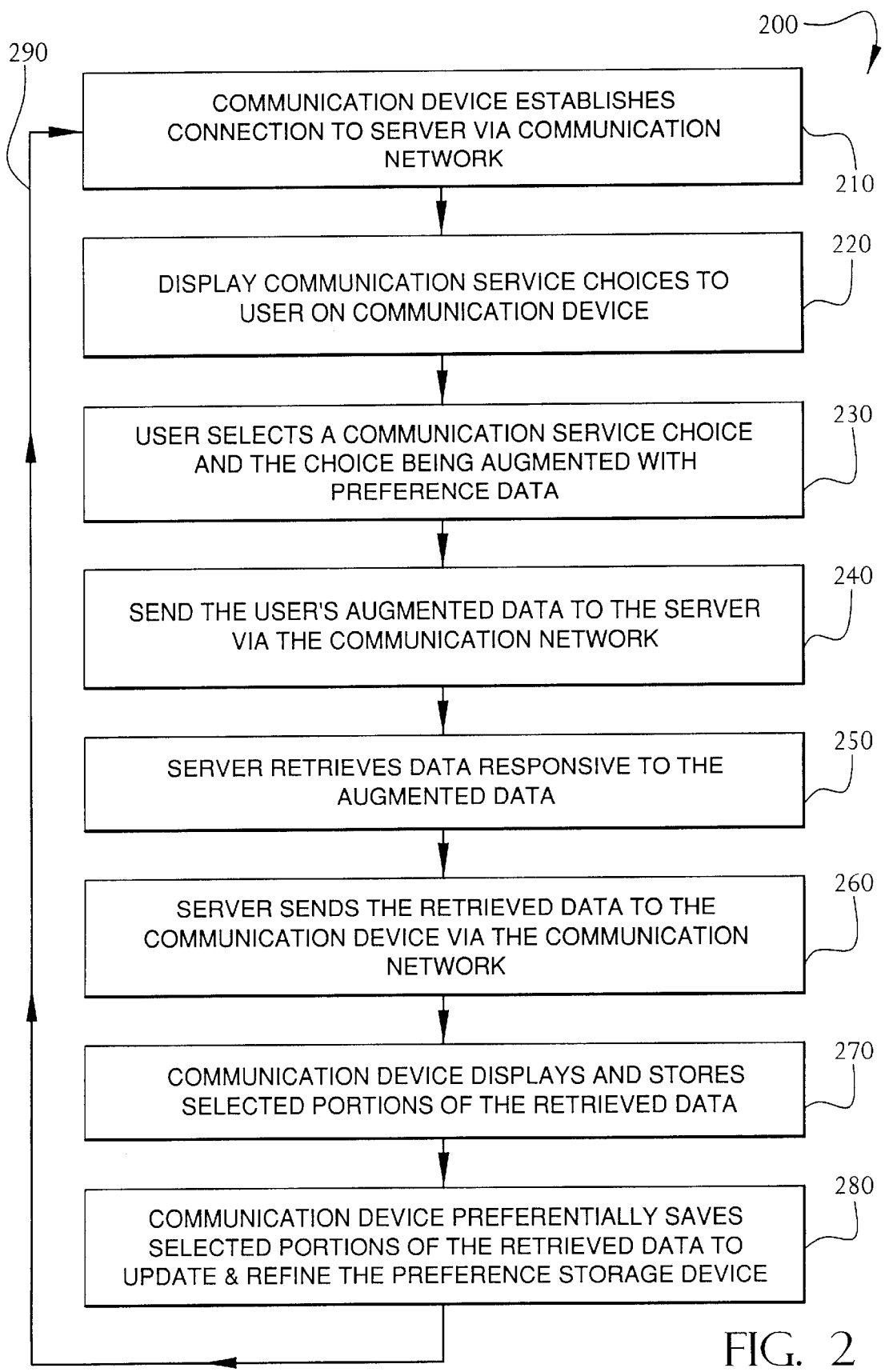
FIG. 2 is a flowchart illustrating a method for requesting information across a communication network of the adaptive communication data retrieval system.

In one implementation as shown in FIGS. 1 and 2, a method 200 for an adaptive communication data retrieval system provides for sending and receiving personalized information from a communication device 40 via a communication network 30 to a server 10 based retrieval system. The communication device, 40 sends and receives data via the communication network 30. The server 10 receives augmented data sent from the communication device 40.

Referring to FIG. 2, in step 210 the communication device 40 establishes a connection to the server 10 via the communication network 30. The server 10 maintains a data listing of communication service choices that are available to the communication device 40 through a graphical user interface 60. In step 220, the server 10 sends the communication service choices via the communication network 30 to the communication device 40 for display to the user.

The user selects a communication service choice that is augmented with preference data from the preference storage device 70 as in step 230. As discussed above, the user can choose a communication service choice through the graphical user interface 60. The graphical user interface 60 can be any graphical based program that allows input interaction such as a propriety software program or an Internet web browser. The actual selection of the communication service choices can be done through manual entry, voice communication, and/or thought process mechanisms as discussed above. Once the user selects a communication service choice, the preference storage device 70 provides preference data that is combined with user's communication service choice resulting in augmented data. As discussed above, the preference data comprises user preferences and environmental data.

In step 240, the communication device 40 sends the augmented data to the server 10 via the communication network 30. The server 10 retrieves data responsive to the augmented data by use of the facilitator 100 in step 250. When the server 10 receives the augmented data, the facilitator 100 parses the augmented data into retrievable categories. The facilitator 100 uses the retrievable categories to direct sub-component programs to search the databases 20. The sub-component programs return the results of the search data to the facilitator 100. The facilitator 100 can have the ability to take the retrieved search data from the sub-components and add historical suggestion data. The historical suggestion data can reside on the server 10 or in an external database. The historical suggestion data will preferably be a listing of the most widely accessed choices from a plurality of users. This means that the user will receive the data they requested and also receive historical suggestion data.

The server 10 sends the retrieved data to the communication device 40 via the communication network 30 in step 260. The communication device 40 displays and stores selected portions of the retrieved data in step 270. In one implementation, the communication device 40 will display the search results of the user's augmented data and a separate list of suggestions based on other users most accessed choices. The communication device 40 stores selected portions of the retrieved data for the user to access on a temporal basis.

In step 280, the communication device 40 preferentially saves selected portions of the retrieved data to update and refine the preference storage device 70. The preference storage device 70 can independently eliminate and/or add to the saved preference data. The process repeats again at step 210 as shown in step 290. The implementation of the invention is not dependent on any particular device and can be implemented in various configurations and architectures.

The adaptive communication data retrieval system of the present invention provides many advantages over devices currently available for use. It allows for highly personalized data retrieval in a quick, efficient, and easy to use manner. It has an adaptive capability to learn and become more efficient at finding focused personalized information through learned usage patterns and/or historical data.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

I claim:

1. A system for sending and receiving data in response to a user request of a plurality of user requests, the system comprising:
   (a) a communication network for facilitating transmission of data comprising the user request, selectable service choice data, augmented data, and service response data;
   (b) a communication device for sending the user request and the augmented data, and for receiving the selectable service choice data and the service response data via the communication network, the communication device comprising:
      a graphical user interface for inputting a current selection preference in response to the received selectable service choice data;
      a preference storage device for storing a history of selection preferences comprising the current selection preference and at least a portion of the service response data, for retrieving at least a portion of the history of selection preferences, for analyzing the at least a portion of the history of selection preferences and creating preference data therefrom;
      a positioning device for generating positioning data; and
      an augmenter for generating the augmented data utilizing the preference data, the current selection preference, and the positioning data;
   (c) a plurality of databases for storing information data, the selectable service choice data that is available to the communication device, and a historical data record of the plurality of user requests; and
   (d) a server connected to the plurality of databases and in communication with the communication device via the communication network, the server for responding to the user request by retrieving the selectable service choice data from the plurality of databases and sending the selectable service choice data to the communication device, the server receiving the augmented data from the communication device and sending the service response data in response to the augmented data, the server comprising:
      a facilitator comprising:
         a parser for parsing the augmented data into parsed augmented data; and
         an analyzer for maintaining and analyzing the historical data record, and for creating the service response data from the historical data record and from at least one portion of the information data that corresponds to the parsed augmented data.

2. A system for providing a mobile communication device with requested information, said system comprising:
   a mobile communication device;
   a server;
   a communication network operatively connecting the mobile communication device and the server; and
   an information database operatively connected to the server,
   wherein said mobile communication device includes:
      means for interfacing with said communication network;
      means for determining environmental data relating to the mobile communication device;
      means for storing and modifying user preference data;
      means for selecting communication service choices data received from said server; and
      means for creating augmented data through a combination of selected communication service choices data, user preference data, and environmental data, and
   wherein said server includes:
      means for interfacing with said communication network;
      means for interfacing with said information database;
      means for storing and selecting communication service choices data to be sent to said mobile communication device; and
      means for retrieving information data from the information database based on augmented data received from the mobile communication device.

3. The system of claim 2 wherein the server further includes means for parsing augmented data received from said mobile communication device.

4. The system of claim 2 wherein the environmental data includes data selected from the group consisting of: a current position of the mobile communication device, a current time, a current temperature, a current weather condition, and user scheduling information.

5. The system of claim 2 wherein the environmental data includes a current position of the mobile communication device, and data selected from the group consisting of: a current time, a current temperature, a current weather condition, and user scheduling information.

6. The system of claim 2 wherein the mobile communication device further includes a component selected from the group consisting of: a thermometer, a barometer, and a means for storing user scheduling information.

7. The system of claim 2 wherein the means for selecting communication service choices data received from said server includes a graphical user interface.

8. The system of claim 2 wherein the user preference data includes user profile data and historical data.

9. The system of claim 2 wherein the server further includes means for providing historical suggestion data to the user.

10. The system of claim 2 wherein the mobile communication device further comprises means for storing information data received from said server.

11. The system of claim 2 wherein the communication network includes wireless connections.

12. A system for providing a mobile communication device with requested information, said system comprising:
    a mobile communication device;

a server;

a communication network operatively connecting the mobile communication device and the server; and an information database operatively connected to the server, wherein said mobile communication device includes means for creating augmented data by modifying communication service choices data received from said server with data selected from the group consisting of: user preference data, environmental data, and a combination of user preference data and environmental data, and wherein said server includes means for retrieving information data from the information database based on augmented data received from the mobile communication device.

13. The system of claim 12 wherein the server further includes means for parsing augmented data received from said mobile communication device.

14. The system of claim 12 wherein the environmental data includes data selected from the group consisting of: a current position of the mobile communication device, a current time, a current temperature, a current weather condition, and user scheduling information.

15. The system of claim 12 wherein the user preference data includes user profile data and historical data.

16. The system of claim 12 wherein the server further includes means for providing historical suggestion data to the user.

17. The system of claim 12 wherein the server further includes means for storing, selecting, and transmitting communication service choices data to said mobile communication device.

18. The system of claim 12 wherein the communication network includes wireless connections.

19. In a system including a mobile communication device connected to a server by a communication network, a method of providing the mobile communication device with requested information, said method comprising the steps of:

transmitting a request for information from the mobile communication device to the server;

transmitting communication service choices data from the server to the mobile communication device in response to the request for information;

selecting a communication service choice from the communication service choices data transmitted to the mobile communication device;

accessing data from memory located in the mobile communication device, said accessed data being selected from the group consisting of user preference data, environmental data, and a combination of user preference data and environmental data;

creating augmented data at the mobile communication device by modifying the selected communication service choice with the accessed data;

transmitting the augmented data from the mobile communication device to the server over the communication network;

retrieving requested information from an information database based on augmented data received at the server; and providing the requested information to the mobile communication device.

20. The method of claim 19 further comprising the step of parsing the augmented data in preparation of retrieving the requested information.

21. The method of claim 19 wherein the environmental data includes data selected from the group consisting of: a current position of the mobile communication device, a current time, a current temperature, a current weather condition, and user scheduling information.

22. The method of claim 19 wherein the user preference data includes user profile data and historical data.

23. The method of claim 19 further comprising the step of providing historical suggestion data to the user in response to the request for information.

24. In a system including a mobile communication device connected to a server by a communication network, a method of providing the mobile communication device with requested information, said method comprising the steps of:

transmitting a request for information from the mobile communication device to the server;

selecting a communication service choice responsive to the request for information;

accessing data selected from the group consisting of user preference data, environmental data, and a combination of user preference data and environmental data;

creating augmented data by modifying the selected communication service choice with the accessed data;

retrieving requested information from an information database based on augmented data; and providing the requested information to the mobile communication device.

25. The method of claim 24 further comprising the step of parsing the augmented data in preparation of retrieving the requested information.

26. The method of claim 24 wherein the environmental data includes data selected from the group consisting of: a current position of the mobile communication device, a current time, a current temperature, a current weather condition, and user scheduling information.

27. The method of claim 24 wherein the user preference data includes user profile data and historical data.

28. The method of claim 24 further comprising the step of providing historical suggestion data to the user in response to the request for information.

* * * * *